United States Patent [19]

Reusser

[11] 4,279,621

[45] Jul. 21, 1981

[54] POLYAMINES MIXTURE FOR STABILIZING CERTAIN HYDROCARBONS AGAINST OXIDATION

[75] Inventor: Robert E. Reusser, Bartlesville, Okla.

[73] Assignee: Phillips Petroleum Company, Bartlesville, Okla.

[21] Appl. No.: 942,216

[22] Filed: Sep. 14, 1978

[51] Int. Cl.$^3$ .................. C10L 1/22; C07C 87/20
[52] U.S. Cl. ........................ 44/72; 564/491; 564/512
[58] Field of Search ................ 44/72; 260/583 P

[56] References Cited

U.S. PATENT DOCUMENTS

| | | | |
|---|---|---|---|
| 1,992,014 | 2/1935 | Rogers et al. | 44/9 |
| 2,279,561 | 4/1942 | Dietrich | 252/50 |
| 2,333,294 | 11/1943 | Chenlock | 44/72 |
| 2,390,766 | 12/1945 | Zellhoefer et al. | 260/583 |
| 2,672,408 | 3/1954 | Benner | 44/72 |
| 2,681,935 | 6/1954 | Thompson | 44/72 |
| 3,084,034 | 4/1963 | Kalinowski | 44/72 |
| 3,198,763 | 8/1965 | Peterli | 260/45.8 |
| 3,519,687 | 7/1970 | Schneider et al. | 260/583 P |
| 3,687,645 | 8/1972 | Miller | 44/72 |
| 3,741,909 | 6/1973 | Yamane et al. | 252/401 |
| 3,840,583 | 10/1974 | Turk et al. | 260/465.8 R |
| 3,880,928 | 4/1975 | Drake | 260/583 |
| 3,880,929 | 4/1975 | Drake | 260/583 P |
| 3,896,173 | 8/1975 | Drake | 260/583 P |
| 3,896,174 | 8/1975 | Drake | 260/583 P |
| 3,898,286 | 9/1975 | Drake | 260/583 P |
| 3,969,315 | 8/1976 | Beadle | 260/45.8 NW |
| 3,985,786 | 10/1976 | Drake | 260/465.8 R |
| 4,003,933 | 1/1977 | Drake | 260/583 P |

OTHER PUBLICATIONS

*Mechanism of Antioxidant Action in Gasoline*, C. J. Pedersen, 1956, "Industrial and Engineering Chemistry", pp. 1881–1884, Dupont.

*Encyclopedia of Chemical Technology*, vol. 2, Kirk–Othmer, 1963, pp. 588–602, John Wiley & Sons.

*The Effect of Aromatic Compounds on the Vapor-Phase Oxidation of Fuels*, A. D. Walsh, 1949, pp. 1043–1048, University of Leeds.

*Primary Examiner*—Patrick Garvin
*Assistant Examiner*—Raymond K. Covington

[57] ABSTRACT

Hydrocarbon-containing materials having a low amount of unsaturation e.g., paraffinic and napththenic hydrocarbons having less than about 10 weight percent unsaturation are stabilized or made more resistant to oxidation employing a polyamines mixture obtained as a heavy by-product residue from the recovery by distillation of a polyamine obtained in the hydrogenation of branched aliphatic dinitriles. In one embodiment an isoparaffinic hydrocarbon obtained by alkylation of an isoparaffin with an olefin is rendered resistant to oxidation.

14 Claims, No Drawings

POLYAMINES MIXTURE FOR STABILIZING CERTAIN HYDROCARBONS AGAINST OXIDATION

This invention relates to the stabilization or the rendering resistant to oxidation of certain hydrocarbons. In one of its aspects the invention relates to a new oxidation inhibiting composition. In another of its aspects the invention relates to a method of rendering oxidation resistant certain hydrocarbon-containing substances or materials.

In one of its concepts the invention provides a method for rendering oxidation resistant a hydrocarbon-containing material generally of the paraffinic and naphthenic type having a low unsaturation by incorporating thereinto an oxidation-inhibiting amount of a mixture of polyamines which are obtained as a heavy by-product residue when distilling polyamine obtained from the hydrogenation of a branched aliphatic dinitrile containing from about 7 to 30 carbon atoms per molecule. In another of its concepts the invention provides a hydrocarbon composition containing said residue, the composition having been thereby rendered resistant to oxidation.

The polyamines mixture of the invention was found to give good results with hydrocarbon of low unsaturation, as described and exemplified herein, while it did not give effective protection against oxidation to a gasoline obtained by catalytic cracking.

Certain application areas that employ hydrocarbons, particularly liquid hydrocarbons, require that the hydrocarbon being used possess some degree of oxidation resistance to help maintain the performance level of the product being used for a specific application. For example, solvents used in photocopying liquids, aerosols, paint thinners, insecticide carrier oils, charcoal lighter fluids, industrial cleaning compounds, and the like need to maintain certain specifications relating to odor, color, solubility, volatility upon aging or oxygen exposure. Also, gasolines, lubricating oils, greases and the like need to maintain their properties when exposed to oxygen. Most hydrocarbons are more or less sensitive to oxygen or oxidation and, therefore, require some type of addditive to enhance oxidation resistance. The choice of these additives is dependent for the most part on the level of oxygen sensitivity of the hydrocarbon being used (i.e., saturation versus unsaturation, linear versus branched, etc.), effectiveness of the oxidation inhibitor being added, and on compatibility, stability, corrosion resistance, color, odor, and the cost of the additive. Hence, the need for a certain type of oxidation inhibitor that can be used with a particular hydrocarbon is as varied as the types of application areas in which the hydrocarbon-oxidation inhibitor is being employed.

The following patents variously relate generally to use of amines to inhibit oxidation. U.S. Pat. Nos. 1,992,014, 2,279,561, 2,333,294, 2,672,408, 3,198,763 and 3,969,315 issued Feb. 19, 1935, Apr. 14, 1942, Nov. 2, 1943, Mar. 16, 1954, Aug. 3, 1965 and July 13, 1976, respectively.

The material of the invention, i.e., the polyamines mixture, which has been found to yield results as herein described and exemplified is obtained upon a distillation conducted following hydrogenation of branched aliphatic dinitriles as described in patents incorporated herein by reference below.

It is an object of this invention to provide a method for stabilizing a hydrocarbon. It is another object of the invention to provide a composition suited for stabilizing a hydrocarbon against oxidation. A further object of the invention is to provide method and composition for stabilizing certain type paraffinic hydrocarbons and alkylated gasoline distillates suitable for use as motor fuel components and such fuels.

Other aspects, concepts and objects are apparent from a study of this disclosure and the appended claims.

According to the present invention the polyamine mixtures useful to stabilize the herein described hydrocarbons of low unsaturation predominantly contain components generally corresponding to the general formula

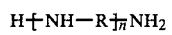

wherein R is selected from branched alkylene radicals having 7 to 30 carbon atoms and wherein n generally has a value of from 2 to about 6.

This invention relates to the stabilization of paraffinic hydrocarbons and alkylated gasoline distillates against oxidation through the use of a polyamine mixture obtained as a distillation residue or a "heavies" by-product from the preparation of a diamine. In one embodiment the invention provides a composition comprised of a paraffinic hydrocarbon and a residue obtained from the distillation of 5-methylnonane-1,9-diamine from a hydrogenation reaction mass. Another embodiment of this invention provides a method of promoting the oxidation stability of said paraffinic hydrocarbons. Still, another embodiment of this invention provides a composition comprised of an alkylate gasoline distillate and a residue obtained from the distillation of 5-methylnonane-1,9-diamine from a hydrogenation reaction mass. A final embodiment of this invention provides for a method of promoting the oxidation stability of said alkylate gasoline distillate.

The mixture of polyamines useful in this invention is obtained as the heavy by-product residue from the distillation of a polyamine obtained from the hydrogenation of branched aliphatic dinitriles containing from 7 to 30 carbon atoms per molecule and preferably 9 to 12 carbon atoms per molecule.

The polyamine mixtures useful in this invention contain predominantly components generally corresponding to the general formula

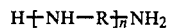

wherein R is selected from branched alkylene radicals of 7 to 30, and preferably 9 to 12, carbon atoms per radical and wherein n generally has the value of from 2 to about 6. Said branched alkylene radicals will contain one or more side chains with each side chain being an alkyl radical of one to about six carbon atoms per alkyl radical.

The above-described branched aliphatic dinitriles from which the polyamine mixture of this invention are prepared can be free from olefinic unsaturation or can contain olefinic unsaturation. Representative examples of olefinically unsaturated branched dinitriles include such compounds as 4-methyl-3-hexenedinitrile, 4-ethyl-3-hexenedinitrile, 5-methyl-4-nonenedinitrile, 5-ethyl-4-decenedinitrile, 7-methyl-6-tridecenedinitrile, 7-methyl-6-pentadecenedinitrile, 12-methyl-12-tetracosenedinitrile, 10-hexyl-9-tetracosenedinitrile, 2,3-dimethyl-3-hexenedinitrile, 2,4,6-trimethyl-3-heptenedinitrile, 4-ethyl-6,7-dimethyl-3-octenedinitrile, 2,4,6-triethyl-3-octenedinitrile, 2-ethyl-4,6-dipropyl-3-octenedinitrile, 2-methyl-4-6,8,10-tetrapropyl-3-dodecenedinitrile, 2,4,7,9,11,13,15-heptaethyl-6-hexadecenedinitrile, 6-methyleneundecanedinitrile, 7-methylenetridecanedinitrile, 8-methylenepentadecanedinitrile, 12-methylenetetracosanedinitrile, 15-methylenenonacosanedinitrile, 2-methyl-3-methylenepentanedinitrile, 2,4-dimethyl-3-methylenepentanedinitrile, 2-methyl-4-methyleneoctanedinitrile, 2-methyl-7-ethyl-4-methyleneoctanedinitrile, 2,4,8-trimethyl-6-methylenedodecanedinitrile, 2,4,8,10-tetrapropyl-6-methylene-dodecanedinitrile, 2,26-dimethyl-14-methyleneheptacosanedinitrile, and mixtures thereof. The saturated analogs of the above olefinically unsaturated branched dinitriles are representative examples of branched aliphatic dinitriles free from olefinic unsaturation.

A presently preferred branched-chain unsaturated aliphatic dinitrile feedstock for employment in the preparation of polyamine mixtures for use in this invention is the dinitrile reaction product mixture obtained by the reaction of isobutylene and acrylonitrile. This dinitrile reaction product mixture generally comprises 5-methyl-4-nonenedinitrile, 2,4-dimethyl-4-octenedinitrile, 2,4-dimethyl-3-octenedinitrile, 2,4,6-trimethyl-3-heptenedinitrile, 5-methylenenonanedinitrile, 2-methyl-4-methyleneoctanedinitrile, and 2,6-dimethyl-4-methyleneheptanedinitrile. This preferred unsaturated dinitrile mixture is readily prepared by procedures described in U.S. Pat. Nos. 3,840,583 and 3,985,786, issued Oct. 8, 1974 and Oct. 12, 1976, respectively.

The hydrogenation of the above-described branched aliphatic dinitriles can be conducted as described in U.S. Pat. Nos. 3,880,928; 3,880,929; 3,896,173; 3,896,174; 3,898,286 issued Apr. 29, 1975, Apr. 29, 1975, July 22, 1975, July 22, 1975, Aug. 5, 1975, respectively; and others. The disclosures of patents mentioned herein are incorporated by reference. Separation of the light reaction products, i.e., saturated aliphatic diamines, from the heavy polyamine mixture is accomplished by conventional means, such as fractional distillation at about 200° C. and about 0.13 MPa (10 mm torr) pressure. The polyamine mixture useful in this invention is referred to in the above patents pertaining to hydrogenation as "heavies" or "distillation residue" and generally contains no more than about 2 wt % of the saturated aliphatic diamine.

Catalysts which can be used for the hydrogenation of the branched aliphatic dinitriles include platinum-, palladium-, ruthenium-, cobalt-, and nickel-containing compounds, alone or combinations thereof or in combinations with various known promoters. Any of the well-known catalyst supports, such as alumina, can be employed. The hydrogenation can be conducted in a single stage or in a two-stage reaction, in which, if desired, the olefinic unsaturation, should any be present, is hydrogenated under different conditions than the nitrile groups. If desired, the hydrogenation or a portion or a stage thereof can be conducted in the presence of a secondary amine suppressant, such as ammonia or tertiary amines.

The hydrogenation of the branched aliphatic dinitriles can be carried out in the temperature range of about 30° C. to about 250° C., preferably in the range of about 70° C. to about 200° C. and in the pressure range of from about 3.5 megapascals to about 35 megapascals preferably to about 20 megapascals.

The diluent utilized in the hydrogenation process, if desired, is generally selected from the group consisting of alcohols, ethers, hydrocarbons, and mixtures thereof which will adequately dissolve or suspend the reaction product to facilitate hydrogenation. Suitable diluents include methanol, ethanol, 2-propanol, 2-methyl-2-propanol, 2-butanol, 1-hexanol, diethyl ether, 1,4-dioxane, tetrahydrofuran, n-hexane, n-heptane, 2,2,4-trimethylpentane, cyclohexane, and mixtures thereof. To facilitate hydrogenation and handling of the reaction mixtures, the diluents will generally be employed in amounts ranging from 2/1–20/1 and preferably 5/1–12/1 parts by weight of diluent per part by weight of reaction product.

The heavy polyamine mixture employed in the present invention is separated from the hydrogenation reaction mixture by conventional means, such as filtration to remove catalyst particles, followed by evaporation or preferably by distillation of volatile materials thus leaving a heavy mixture of polyamine compounds. Generally, the upper limit for the distillation is about 200° C. at about 0.133 MPa (10 tm torr) pressure which leaves no more than about 1–2 wt % of the saturated aliphatic diamine in the residue.

The heavy polyamine mixture useful in this invention can be added to the hydrocarbon being stabilized in any convenient manner. The concentration which the heavy polyamine mixture is used can be any level that gives a satisfactory oxidation resistance. Normally, the heavy polyamine mixture of the present invention is added to the hydrocarbon to be stabilized in units corresponding to either weight percent or parts per million of hydrocarbon (ppm) and can be employed in a broad range of 0.001 wt % (10 ppm) to about 1 wt % (10,000 ppm) although the preferred range is 0.01 wt % (100 ppm) to 0.1 wt % (1000 ppm).

The foregoing weights percent or parts per million are the usual amounts which ordinarily are used to stabilize, say, a motor fuel or component thereof. With such amounts the materials to be stabilized, according to the invention, will not have more than about 10 wt % unsaturation. However, when the materials have more than about 10 wt % the amount of the stabilizer used should be correspondingly increased. The amount to be used for any particular substance can be determined by routine tests. Thus, judging by the data, an increased amount of stabilizer would have been required to suitably stabilize the gasoline resulting from the catalytic operation.

Some advantages envisioned of the use of the heavy polyamine mixture of the present invention are:

1. A kettle product, the heavy polyamine mixture has a low cost and is competitive with the more common oxidation inhibitors.

2. Being combustible and non-residual, a desirable feature in combustible fuels.

3. Having better compatibility with the product to be stabilized because the polyamine mixture has a hydrocarbon back-bone and less apt to bleed when used in solid hydrocarbon-based products.

4. Easier to dissolve in hydrocarbons.

Generally, with the now preferred amounts, weights percent or parts per million above given, the materials that can be made more resistant to oxidation are those which will have a low unsaturation, i.e., of the order of less than about 10 wt %. Such materials are, generally, paraffinic and naphthenic type hydrocarbons. Generally hydrocarbons that are prepared by an alkylation process are considered to be the type materials best suited with the present invention. Such alkylation processes can be, for example, those based on hydrogen fluoride (HF), aluminum trichloride, and other similar types. Hydrocarbons prepared by a catalytic process whereby the amount of unsaturation is greater than 10 wt % is considered to be outside the scope of the present invention. Hydrocarbons prepared by a catalytic process whereby the amount of unsaturation is less than 10 wt % are within the scope of this invention. The unsaturation of hydrocarbons is determined by either ASTM D875-64 or ASTM D1019-68.

The heavy polyamine antioxidant of the present invention can be used with hydrocarbons relating to many different type products such as, for example, solvents, charcoal lighter fluids, photocopy solvents, aerosols, paint thinners, industrial cleaning compounds, gasolines, lubricating oils, kerosines, automatic gearing liquids, turbine oils, cutting oils, hydrocarbon waxes, jet fuels, greases, saturated elastomers, fibers, and the like. The heavy polyamine antioxidant of the present invention can also be used in combination with other antioxidants, stabilizers, and additives, etc.

In the Tables II and III the apparent use of oxygen upon cooling appears to be due to the reduced oxygen pressure. Preceding runs appear to confirm this view.

The specific hydrocarbons used to demonstrate the operability of the present invention are listed below and are hereafter referred to by the type of the material used as shown in Table I.

TABLE I

Hydrocarbons Employed
The following hydrocarbons, it will be noted, boil within the gasoline boiling point range.

Hydrocarbon A: Highly branched HF alkylated aliphatic hydrocarbon Soltrol® 50, Phillips Petroleum Company
1. Distillation Range (ASTM-D86): IBP$^a$ 244F. (117.8C.)
   10% 252F. (122.2C.)
   50% 260F. (126.7C.)
   90% 285F. (140.5C.)
   95% 295F. (146.1C.)
   Dry Point 299F.
2. API Gravity at 60F. (15.6C.), 64.2 (ASTM-D287)
3. Specific Gravity 60-60F., 0.7232 (ASTM-D1298)
4. Density, 60F. (15.5C.), lbs/gal 6.02 (ASTM-D1250)
5. Flash Point, TCC$^b$, 50F. (10C.) (ASTM-D56)
6. Typical GLC$^c$ Analysis: C$_7$ trace
   C$_8$ 66–74 wt %
   C$_9$ 18.8–24.8 wt %
   C$_{10}$ 7.3–9.1 wt %
7. % Unsaturation, nil
Hydrocarbon B: HF alkylate gasoline, Phillips Petroleum Company
1. Distillation Range: IBP$^a$ 80F. (26.7C.)
   10% 122F. (50.0C.)
   50% 210F. (98.9C.)
   90% 311F. (154.9C.)
   Dry Point 423F. (217.2C.)
2. API Gravity, 60/60, 72.8
3. Motor Octane No. 89.0
4. Research Octane No. 89.7
5. Gum Value 2.5
6. Heptane Wash No. 0
7. % Unsaturation nil
Hydrocarbon C: Catalytic cracked gasoline Phillips Petroleum Company
1. Distillation Range: IBP$^a$ 97F. (36.1C.)
   10% 141F. (60.5C.)
   50% 241F. (116.1C.)
   90% 379F. (192.8C.)
   Dry Point 424F. (217.8C.)
2. API Gravity, 60/60, 55.1

TABLE I-continued

Hydrocarbons Employed
The following hydrocarbons, it will be noted, boil within the gasoline boiling point range.

3. Motor Octane No. 86.9
4. Research Octane No. 87.4
5. Gum Value 3.8
6. Heptane Wash 2.4
7. Total Nitrogen 33 ppm
8. Analysis: Paraffins 26.11 wt %
   Olefins 39.74 wt %
   Naphthenes 11.41 wt %
   Aromatics 22.74 wt %

$^a$IBP = Initial Boiling Point
$^b$TCC = Tag Close Cup
$^c$GLC = Gas Liquid Chromatography The following examples serve to illustrate the operability of this invention.

EXAMPLE I

The heavy polyamine mixture described in the current invention was prepared in a sequence of steps which involved the reaction of isobutylene and acrylonitrile to produce a mixture of olefinically unsaturated dinitriles which was subsequently recovered by fractional distillation, hydrogenation of the dinitrile mixture and filtration and subsequent distillation of the reaction product to separate volatile diamine products from the desired heavy polyamine mixture.

A solution of acrylonitrile (one part by weight), isobutylene (2 parts by weight), a monoadduct reaction product of isobutylene and acrylonitrile (as described in U.S. Pat. No. 3,985,786 and containing predominantly 5-methyl-5-hexenenitrile and 2,4-dimethyl-4-pentenenitrile; 2 parts by weight), and water (0.25 parts by weight) was continuously added to a 19 liter reactor at 270°–280° C. and 17 megapascals. Residence time in the reactor of 0.6 to 0.7 hours resulted in about 50 percent of the acrylonitrile being converted.

Effluent from the above-described reactor was fractionally distilled to separate unreacted starting materials for recycle and products, including a diadduct reaction product mixture (as described in U.S. Pat. No. 3,985,786 and containing predominantly 5-methylene-1,9-nonanedinitrile and 5-methyl-4-nonenedinitrile and minor amounts of other isomers; diadduct product mixture represents about 85 percent by weight of total products) and a heavy distillation residue (about 15 percent by weight of total products).

The above-described diadduct product mixture was hydrogenated in a 2-stage continuous hydrogenation system. Two tubular reactors (the first 5.1 cm diameter×2.45 m length and the second 5.1 cm diameter×3.05 m length) were connected in series. The first reactor contained 4.7 kg of 0.5 weight percent palladium on alumina, while the second reactor contained 5.0 kg of 0.5 weight percent ruthenium on alumina. A solution of the diadduct product mixture (0.454 kg/hr) and tert-butyl alcohol (3.68 kg/hr) was pumped through the reactors along with one scfm (standard cubic feet per minute) of hydrogen. Ammonia (0.68 kg/hr) was added to the stream between the first and second reactors. The reactors were maintained at 11 megapascals and 100° C. for the first reactor and 10.3 megapascals and 121° C. for the second reactor.

The resultant reaction mixture was fractionally distilled to remove solvent and volatile products (mixture containing predominantly 5-methyl-1,9-nonanediamine and other isomers and other by-products in minor amounts). The remaining heavy distillation residue was a viscous, dark-colored liquid mixture of polyamines (10.4 weight percent based on total products).

The resulting heavy polyamine mixture was found to have an average molecular weight of 393 (by vapor pressure osmometry) and an average of 3.2 equivalents of nitrogen per mole (by titration with 0.1 N HCl). Analysis of the polyamine mixture by infrared and nuclear magnetic resonance spectroscopy revealed that the mixture contained predominantly compounds of general formula

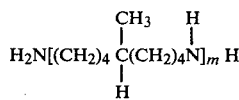

and minor amount of other isomers. Of the total polyamine mixture, approximately 70 percent by weight corresponded to the above formula with m=2. The remaining approximately 30 weight percent corresponded to the above formula with m=3 and 4 and minor amounts of other isomers and higher oligomers.

EXAMPLE II

This example demonstrates the current invention. To a 500 milliliter glass-lined stainless steel pressure vessel was charged 50 milliliters of HF alkylated aliphatic hydrocarbon (Hydrocarbon A), the pressure vessel sealed, pressurized to 100 psig (0.689 megapascals, MPa) and placed in a 98.9° C. (210° F.) water bath. The amount of oxygen absorbed was periodically recorded. The experiment was repeated except 0.05 wt. % (500 ppm) of the heavy polyamine mixture described in Example I was also added to the pressure vessels. The results of these tests are shown in Table II where it is seen that hydrocarbon A without the heavy polyamine mixture present is sensitive to oxygen whereas when the heavy polyamine mixture is present the hydrocarbon is very stable in an oxygen environment.

TABLE II
EFFECT ON HEAVY POLYAMINE MIXTURE ON THE OXIDATION RESISTANCE OF HYDROCARBON A OXYGEN ABSORPTION AT 98.9° C. (210° F.)

| | Hydrocarbon A[a] | | | Hydrocarbon A + 0.05 wt % (500 ppm) Heavy Polymine Mixture | | |
|---|---|---|---|---|---|---|
| Time, hrs | psig | (MPa) | % O$_2$ Used[b] | psig | (MPa) | % O$_2$ Used[b] |
| initial at 25° C. | 100 | (.689) | — | 100 | (.689) | — |
| 0 | 130 | (.897) | — | 130 | (.897) | — |
| 3 | 130 | (.897) | nil | 130 | (.897) | nil |
| 18 | 120 | (.828) | 7.69 | 130 | (.897) | nil |
| 24 | 115 | (.794) | 11.54 | 133 | (.918) | nil |
| 43 | 90 | (.621) | 30.77 | 128 | (.883) | 1.50 |
| 48 | 85 | (.587) | 34.62 | 133 | (.918) | nil |
| 65.5 | 35 | (.242) | 73.08 | 125 | (.863) | 3.85 |
| Cooled to 25° C. | 0 | (0) | 100.0 | 90 | (.621) | 10.0 |

[a]Vapor pressure of hydrocarbon A at 98.9° C. is about 30 psig.
[b]% O$_2$ calculated: O$_2$ decrease in psig ÷ original O$_2$ pressure at corresponding temperature × 100.

EXAMPLE III

The test procedure described in Example II was followed to evaluate the effect of the heavy polyamine mixture of the inventory as an oxidation inhibitor for HF alkylate gasoline (hydrocarbon B). These results are listed in Table III and again show that the heavy polyamine mixture is very effective in inhibiting oxygen uptake in another type of hydrocarbon.

TABLE III
EFFECT OF HEAVY POLYAMINE MIXTURE ON THE OXIDATION RESISTANCE OF HYDROCARBON B OXYGEN ABSORPTION AT 98.9° C. (210° F.)

| | Hydrocarbon B[a] | | | Hydrocarbon B + 0.05 wt % (500 ppm) Heavy Polyamine Mixture | | |
|---|---|---|---|---|---|---|
| Time, hrs | psig | (MPa) | % O$_2$ Used[b] | psig | (MPa) | % O$_2$ Used[b] |
| initial at 25° C. | 100 | (.689) | — | 100 | (.689) | — |
| 0 | 153 | (1.054) | — | 153 | (1.054) | — |
| 17 | 153 | (1.054) | 0 | 153 | (1.054) | 0 |
| 24.5 | 155 | (1.068) | 0 | 153 | (1.054) | 0 |
| 40.5 | 150 | (1.034) | 1.96 | 153 | (1.054) | 0 |
| 63.5 | 135 | (.930) | 11.76 | 153 | (1.054) | 0 |
| 87 | 105 | (.723) | 31.37 | 153 | (1.054) | 0 |
| 96 | 90 | (.620) | 41.18 | 153 | (1.054) | 0 |
| Cooled to 25° C. | 30 | (.207) | 70.00 | 90 | (.620) | 10.0 |

[a]Vapor pressure of hydrocarbon B at 98.9° C. is about 53 psig
[b]% O$_2$ calculated: O$_2$ decrease in psig ÷ original O$_2$ pressure at corresponding temperature × 100.

EXAMPLE IV

The test procedure described in Example II was again followed to evaluate the effect of the heavy polyamine mixture of the invention as an oxidation inhibitor for catalytic cracked gasoline (Hydrocarbon C). These results are shown in Table IV and point out that the heavy polyamine mixture is not effective as an oxidation inhibitor for hydrocarbons with significant amounts of unsaturation. Hydrocarbon C has 39.74 wt % olefinic unsaturation.

TABLE IV
EFFECT OF HEAVY POLYAMINE MIXTURE ON THE OXIDATION RESISTANCE OF HYDROCARBON C OXYGEN ABSORPTION AT 98.9° C. (210° F.)

| | | | Hydrocarbon C + 0.05 wt % (500 ppm) Heavy Polyamine Mixture | |
|---|---|---|---|---|
| Time, hrs | psig(MPa) | % O$_2$ Used[b] | psig(MPa) | % O$_2$ Used[b] |
| initial at 25° C. | 100(.689) | — | 100(.689) | — |
| 0 | (a) | | (a) | |
| 18 | 40(.276) | 60.0 | 50(.345) | 50.0 |
| 28 hours | 40(.276) | 60.0 | 50(.345) | 50.0 |

[a]Pressure reading at 98.9° C. not available
[b]% O$_2$ calculated: O$_2$ decrease in psig ÷ original O$_2$ press at 25° C. X100

Reasonable variation and modification are possible within the scope of the foregoing disclosure and the appended claims to the invention the essence of which is that the described heavy polyamine mixture or "heavies" has been found to be an oxidation inhibitor for certain hydrocarbonaceous materials as herein described.

I claim:

1. A stabilized hydrocarbon containing composition stabilized against oxidation, the said composition have incorporated therewith a stabilizing amount of an oxidation inhibiting polyamine mixture consisting essentially of the heavy by-product residue obtained upon distillation of a polyamine obtained from the hydrogenation of branched-chain aliphatic dinitriles containing from about 7 to 30 carbon atoms per molecule, said dinitriles being obtained by the reaction of an olefin and a dinitrile, said mixture being the sole oxidation inhibiting agent in said composition.

2. A composition according to claim 1 wherein the residue is that obtained from the distillation of 5-methylnonane-1,9-diamine.

3. A composition according to claim 1 wherein the hydrocarbon is at least one of a paraffinic and a naphthenic type hydrocarbon having an unsaturation of not more than about 10 weight percent.

4. A composition according to claim 1 wherein the residue is a polyamine mixture containing components generally corresponding to the formula

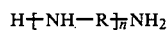

wherein R is selected from branched alkylene radicals having from about 7 to about 30 carbon atoms and wherein n generally has a value of from about 2 to about 6.

5. A composition according to claim 1 wherein the hydrocarbon stabilized is a highly branched aliphatic hydrocarbon obtained upon hydrogen fluoride alkylation of an isoparaffin with an olefin and has a distillation range substantially comprised within the gasoline boiling point range.

6. A composition according to claim 1 wherein the residue is a polyamine mixture containing predominantly compounds of the general formula

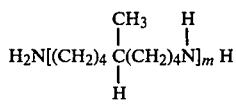

approximately 70 percent by weight of the mixture corresponding to the formula when m equals 2 while remaining approximately 30 weight percent corresponds to a value of m equals 3 and 4 with minor amounts of isomers and higher oligomers.

7. A composition according to claim 1 wherein the hydrocarbon is one obtained by the hydrogen fluoride alkylation of isoparaffin with olefin, has a boiling temperature range in the gasoline boiling point range, and unsaturation of not more than about 10 weight % and the residue is a heavy polyamine mixture having an average molecular weight of about 393, as determined by vapor pressure osmometry, and an average of about 3.2 equivalents of nitrogen per mole as determined by titration with 0.1 N HCl.

8. A method for stabilizing a hydrocarbon containing composition by incorporating therewith a stabilizing amount of an oxidation inhibiting polyamine mixture consisting essentially of the heavy byproduct residue obtained upon distillation of a polyamine obtained from the hydrogenation of branched-chain aliphatic dinitriles containing from about 7 to 30 carbon atoms per molecule, said dinitriles being obtained by the reaction of an olefin and a dinitrile, said mixture being the sole oxidation inhibiting agent in said composition.

9. A method according to claim 8 wherein the residue is that obtained from distillation of 5-methylnonane-1,9-diamine.

10. A method according to claim 8 wherein the hydrocarbon is at least one of a paraffinic and a naphthenic hydrocarbon having an unsaturation of not more than about 10 weight percent.

11. A method according to claim 8 wherein the residue is a polyamine mixture containing components generally corresponding to the formula

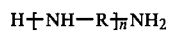

wherein R is selected from branched alkylene radicals having from about 7 to about 30 carbon atoms and wherein n generally has a value of from about 2 to about 6.

12. A method according to claim 8 wherein the hydrocarbon stabilized is a highly branched aliphatic hydrocarbon obtained upon hydrogen fluoride alkylation of an isoparaffin with an olefin and has a distillation range substantially comprised within the gasoline boiling point range.

13. A method according to claim 8 wherein the residue is a polyamine mixture containing predominantly compounds of the general formula

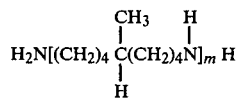

approximately 70 percent by weight of the mixture corresponding to the formula when m equals 2 while remaining approximately 30 weight percent corresponds to a value of m equals 3 and 4 with minor amounts of isomers and higher oligomers.

14. A method according to claim 8 wherein the hydrocarbon is one obtained by the hydrogen fluoride alkylation of isoparaffin with olefin, has a boiling temperature range in the gasoline boiling point range, an unsaturation of not more than about 10 weight % and the residue is a heavy polyamine mixture having an average molecular weight of about 393, as determined by vapor pressure osmometry, and an average of about 3.2 equivalents of nitrogen per mole as determined by titration with 0.1 N HCl.

* * * * *